United States Patent Office 3,337,348
Patented Aug. 22, 1967

3,337,348
PROCESS FOR PREVENTING CHEMICAL BROWNING IN MOIST AND DRY FOOD MATERIAL
William V. White, Spring Valley, and Charles Dame, Jr., Tarrytown, N.Y., assignors to General Foods Corporation, White Plains, N.Y., a corporation of Delaware
No Drawing. Filed Apr. 20, 1966, Ser. No. 543,785
12 Claims. (Cl. 99—130)

The present application is a continuation-in-part of Ser. No. 257,737, filed Feb. 11, 1963, now abandoned.

The present invention relates to anti-browning agents for use in foods and, more specifically, to a particular class of edible organic compounds which will prevent chemical browning in a foodstuff.

There are three general types of browning reactions found in food. One of the most common of these is chemical browning which is the reaction between a carbonyl and amino compound, more commonly known as the Maillard reaction. This type of browning is to be distinguished from enzymatic browning and browning due to pyrolysis (caramelization or organic decomposition due to heat) and is characterized by a chemical reaction between aldehydes, ketones and reducing sugars with amines, amino acids, peptides and protein. Caramelization or pyrolysis occurs when polyhydroxy carbonyl compounds such as sugars or carboxylic acids are heated to relatively high temperatures in the absence of amino compounds to cause a toasting of the product. This invention is not concerned with the prevention of this type of browning. Still another type of browning is concerned with a group of oxidative reactions which are believed to involve the activity of an enzyme to catalyze the reaction, as, for example, when ascorbic acid and polyphenols are converted into colored compounds. This invention is not concerned with this type of browning.

It is generally understood that browning reactions may be either good or bad for food purposes. The type of browning reactions that generally occur at high temperatures are usually desirable types of browning. Familiar examples of these reactions are those that give good flavor and color to bread, cakes and pastries during the baking thereof. Similar reactions are found in the toasting of cereals and the roasting of seeds or nuts such as coffee, cocoa and peanuts. Undesirable browning caused by the Maillard reaction produces off-colors and off-flavors and loss of nutritional value of foods is often found in dried products such as fruits, vegetables, eggs, milk, coconut, gelatin jelly desserts, etc. The Maillard reaction likewise produces off-colors and off-flavors in moist foods such as fresh coconut and meat-containing animal feed. Maillard reaction browning is particularly troublesome in the area of gelatin jelly desserts which incorporate a high level of sugar or other carbohydrate material in conjunction with the gelatin. In many of these applications, conventional anti-browning agents, such as sodium metabisulfite have been used sparingly due to off-flavors produced by the sulfur. Moreover, non-browning sugars such as sucrose are typically used because of the browning problem, and more economical and readily available sugars such as dextrose are generally not used to the extent they might be used because of the browning problems which such sugars present due to the presence of reactive carbonyl groups.

In the prevention of chemical browning it is useful to understand that the first step in the Maillard reaction is a reversible condensation of an amine and an aldehyde. The colorless intermediate compounds are very labile and can be hydrolyzed under very mild conditions to yield the starting reactants. As dehydration and decarboxylation occur, stable bonds are produced and the products are not thereafter hydrolyzable by acid or alkaline solutions. The rate of browning reactions depends upon concentration, moisture, atmosphere, temperature, nature of the reactants and other substances present. The reaction rate increases with an increase in concentration of reactants and reaches a maximum at moisture levels of about 5–15%. However, once the primary reaction occurs, water may not be necessary for subsequent breakdown and the reaction may proceed in an autocatalytic fashion. Since many prepared foods such as gelatin dessert mixes achieve a residual moisture level of as high as 5–10% during storage, and since these preparations typically include proteinaceous and carbohydrate material with reactive carbonyl groups, it is apparent that chemical browning is a serious limitation as to the type of ingredients that may be used. Conventional anti-browning agents have not solved these problems in all cases, the most serviceable anti-browning agent of present commercial use being sulphur dioxide and sulphur-dioxide containing compounds such as sodium metabisulfite.

It would therefore be highly desirable if an edible anti-browning agent were developed to prevent chemical browning in foods containing proteinaceous and reactive carbohydrate material.

The present invention provides a method of preventing undesirable browning in both dry and moist foods containing both proteinaceous material and material with free carbonyl groups. The present invention is also useful in preventing browning in foods which are to undergo subsequent treatments normally causing browning. An example of the latter use is in the prevention of browning of bread during the baking step.

This invention relates to prevention of chemical browning in foods containing carbohydrate and proteinaceous material by incorporation into said food material an edible organic compound capable of hydrolysis on contact with water, said organic compound being selected from the groups consisting of pyrocarbonic acid esters, O-carboxy anhydrides of alpha-hydroxy carboxylic acids, acetyl ethyl carbonate and benzoyl ethyl carbonate, said compounds being present at a level of 0.5–5% by weight of the proteinaceous material, i.e., measured as Kjeldahl nitrogen ×6.25, although even lower levels may be practiced to a lesser degree with a corresponding reduction in efficacy.

The pyrocarbonic acid esters to be used as anti-browning agents according to this invention may be produced by various methods, e.g., reacting chloroformic acid esters with alkali metal salts of half-esters of carbonic acid. The ester produced will correspond to the general formula

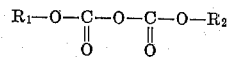

wherein $R_1$ and $R_2$ represent the same or different hydrocarbon radicals, i.e., alkyl radicals such as methyl, ethyl, propyl, isopropyl, butyl, isobutyl, amyl, or isoamyl; aralkyl radicals such as benzyl; cycloalkyl radicals such as cyclohexyl; or aryl radicals such as phenyl. $R_1$ and $R_2$ may also include heterocyclic radicals such as furfuryl.

The O-carboxy anhydrides of alpha-hydroxy acids for use in this invention may preferably be produced by reacting an edible alpha-hydroxy acid, such as lactic or tartaric, with phosgene in the presence of an inert solvent such as tetrahydrofuran or a homologue thereof. The phosgene should be present in an amount which is in excess of the stoichiometric amount required for reaction with the alpha-hydroxy acid. Reference may be had to U.S. Patent No. 3,309,382 for the preparation of these compounds.

The O-carboxy anhydrides of the alpha-hydroxy acids may be represented by the structural formula

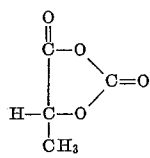

in the case of the O-carboxy anhydride of lactic acid, and by the structural formula

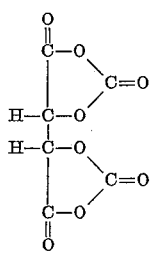

in the case of the bis (anhydro-O-carboxy) tartaric acid. The tartaric acid derivative will have a specific optical isomeric form, i.e., D(−); L(+); D,L; or meso; depending on the optical form of the initial tartaric acid which may be D(−) tartaric; L(+) tartaric; D,L tartaric or meso tartaric acid.

Among the mixed esters of carbonic acid, the esters of acetic and benzoic acid, i.e., acetyl ethyl carbonate and benzoyl ethyl carbonate may be used to inhibit chemical browning.

Preferred compounds for use in this invention are the dimethyl and diethyl esters of pyrocarbonic acid. These esters hydrolyze into carbon dioxide and methyl alcohol in the case of the dimethyl ester and carbon dioxide and ethyl alcohol in the case of the diethyl ester. When using animal gelatin as the proteinaceous material these compounds have a maximum of inhibitory effect when present at a level of about 2.5 to 5.0% by weight of the gelatin present in the food material to be treated. Levels of above 5% by weight of the pyrocarbonate do not add to the inhibitory effect while presenting collateral problems, e.g., imparting a mild fruity-wine taste to the gelatin formulations. The inhibitory effect of the pyrocarbonate begins at levels as low as 0.5% by weight of the gelatin and reaches its peak at levels above 2.5%. It is understood, of course, that this level will vary somewhat when other proteinaceous materials besides animal gelatin are used in conjunction with reactive carbohydrate materials.

It is theorized that the inhibitory effect of the pyrocarbonates, as well as the other anti-browning agents of this invention, involves at least a partial reaction with the free amino groups present in the proteinaceous material. In this manner the amino groups are rendered incapable of reaction with free carbonyl groups in the carbohydrate material. Therefore, it is understood that the level of pyrocarbonate, or other anti-browning organic compounds, will vary somewhat with the protein material employed and the relative number of free amino groups available for reaction. However, in almost all cases the selected compound will be present at a range of 0.5 to 5.0% by weight of the total nitrogen in the proteinaceous material employed.

Although the anti-browning agents for use in this invention are principally directed at prevention of chemical browning due to the carbonyl-amino reaction, or more specially the reactions of reducing saccharides and their precursors and amine-containing compounds such as amino acids, peptides and so-called naturally occurring proteins, it should be understood that browning due to pyrolysis and browning due to enzymatic action may also be avoided incident or preparatory to treatment in accordance with the present invention. In cases where it is desired to inhibit the browning of materials containing enzymes care should be taken to inhibit enzyme activity by blanching or heat treating the foodstuff being protected from chemical browning, fresh fruits and vegatables preferably, prior to treatment with the anti-browning compounds of this invention although collateral treatment in the blanch water may be employed.

This invention will now be described by reference to the following specific examples:

EXAMPLE I.—INGREDIENTS

| | | | | | | | |
|---|---|---|---|---|---|---|---|
| Dextrose Hydrate | 100.0 | 100.0 | 100.0 | 100.0 | 100.0 | 100.0 | 100.0 |
| Gelatin | 10.0 | 10.0 | 10.0 | 10.0 | 10.0 | 10.0 | 10.0 |
| Dimethyl Pyrocarbonate | 0.5 | | | | | | |
| Diethyl Pyrocarbonate | | | 0.5 | | | | |
| Anhydro-O-Carboxy Lactic Acid | | | | 1.0 | | | |
| Bis (Anhydro-O-Carboxy) Tartaric Acid | | | | | 1.0 | | |
| Acetyl Ethyl Carbonate | | | | | | 1.0 | |
| Benzoyl Ethyl Carbonate | | | | | | | 1.0 |

The ingredients in each of the above formulations were blended, packed in wax-coated paper pouches, and stored for four days at 130° F. Residual moisture in the packaged samples was determined to be in the range of about 5–10%. The dextrose hydrate-gelatin sample showed considerable browning (golden brown color) at the end of this period while the remaining samples employing dimethyl pyrocarbonate, diethyl pyrocarbonate, anhydro-O-carboxy lactic acid, bis (anhydro-O-carboxy) tartaric acid, acetyl ethyl carbonate and benzoyl ethyl carbonate showed significant inhibition of chemical browning (remaining almost completely white). After storage for an additional day at 195° F., the inhibitory effect in the various samples containing carbonate compounds was even more evident as these samples retained their almost white color with only slight tanning while the control sample became quite brown in color.

EXAMPLE II

Fresh bread was prepared in the following manner. 3.5 gm. of diethyl pyrocarbonate was mixed with 120 ml. of water and the resulting mixture folded into 90 gm. of a commercial bread mix. No yeast was necessary in the bread formulation since the diethyl pyrocarbonate provided all of the leavening action required. The batter was poured into a greased pan and baked at 375° F. for 25 minutes. The baked bread had a white crust. (Example 5050–90.)

This example shows the utility of the present invention in preventing the browning of food products under conditions which normally causes browning of such foods.

EXAMPLE III

Two 100 gm. samples of fresh, shredded coconut were prepared and to one of them was added 1 ml. of diethyl pyrocarbonate with thorough mixing. Both samples were stored at 90° F. in sealed glass jars. After eight days the samples were examined. The sample containing diethyl pyrocarbonate remained white, and free of mold while the control sample had turned brown and was moldy. (Example 5131–90.)

This example shows how fresh moist fruit can be preserved against browning and molding by means of the present invention.

EXAMPLE IV

A commercial dog food containing about 20% moisture was prepared using 42DE corn syrup solids in place of sucrose. The dog food was divided into two samples. To one of the samples diethyl pyrocarbonate was added in a concentration of 1% by weight. Both samples were stored at 55° C. After 48 hours the samples were examined. The sample containing the diethyl pyrocarbonate showed very little color change while the sample containing no diethyl pyrocarbonate had darkened considerably.

While this invention has been described by reference to specific examples, it is understood to be limited only by the scope of the following claims. In most foodstuff applications ranging from so-called "solid" food to liquid foods having a very high moisture level, the tendency for production of off-colors and off-flavors due to chemical browning is arrested. Employment of organic carbonates in accordance with the present invention permits a greater substitution of reducing for so-called non-reducing sugars in many foodstuff applications without giving rise to the undesirable effects of chemical browning.

What is claimed is:

1. A process for preventing chemical browning in foods containing carbohydrate, having at least one free carbonyl group, and proteinaceous material which comprises incorporating into said food material an edible organic compound capable of hydrolysis on contact with water, said organic compound being selected from the group consisting of pyrocarbonic acid esters wherein the ester groups have at least two carbon atoms each, O-carboxy anhydrides of alpha-hydroxy carboxylic acids, acetyl ethyl carbonate and benzoyl ethyl carbonate, and said compound being present at a level which inhibits browning due to occurrence of a Maillard reaction between the carbohydrate and proteinaceous material.

2. The process of claim 1 wherein the edible organic compound for preventing browning is diethyl pyrocarbonate.

3. The process of claim 1 wherein the edible organic compound for preventing browning is anhydro-O-carboxy lactic acid.

4. The process of claim 1 wherein the edible organic compound for preventing browning is bis (anhydro-O-carboxy) tartaric acid.

5. The process of claim 1 wherein the edible organic compound for preventing browning is acetyl ethyl carbonate.

6. The process of claim 1 wherein the edible organic compound for preventing browning is benzoyl ethyl carbonate.

7. A process for preventing chemical browning in a blend of dry mix ingredients employing a proteinaceous material containing free amino groups and a sugar material containing free carbonyl groups which comprises blending into said dry mix ingredients an edible organic compound capable of hydrolysis on contact with water, said organic compound being selected from the groups consisting of pyrocarbonic acid esters, wherein the ester groups have at least two carbon atoms each, O-carboxy anhydrides of alpha-hydroxy carboxylic acids, acetyl ethyl carbonate and benzoyl ethyl carbonate, and said compound being present at a level of about 0.5–5% by weight of the proteinaceous material.

8. A process for preventing chemical browning in a gelatin jelly dessert mix employing gelatin and a carbonyl-containing sugar which comprises blending into said dry mix an edible organic compound capable of hydrolysis on contact with water, said organic compound being selected from the group consisting of pyrocarbonic acid esters wherein the ester groups have at least two carbon atoms each, O-carboxy anhydrides of alpha-hydroxy carboxylic acids, acetyl ethyl carbonate and benzoyl ethyl carbonate, and said compound being present at a level of about 0.5–5% by weight of the gelatin.

9. The process of claim 8 wherein the carbonyl-containing sugar is dextrose hydrate.

10. The process of claim 1 wherein the food material is a dry food preparation.

11. The process of claim 1 wherein the food material is a moist food product.

12. The process of claim 1 wherein the food material is to be subsequently cooked.

No references cited.

A. LOUIS MONACELL, *Primary Examiner.*

J. M. HUNTER, *Assistant Examiner.*